United States Patent
Sun et al.

(10) Patent No.: US 12,521,218 B2
(45) Date of Patent: Jan. 13, 2026

(54) METHODS FOR CURING DENTAL APPLIANCES

(71) Applicant: DENTSPLY SIRONA Inc., York, PA (US)

(72) Inventors: Benjamin Sun, Charlotte, NC (US); Balaji Prabhu, Indian Land, SC (US)

(73) Assignee: Dentsply Sirona Inc., York, PA (US)

( * ) Notice: Subject to any disclaimer, the term of this patent is extended or adjusted under 35 U.S.C. 154(b) by 359 days.

(21) Appl. No.: 18/205,990

(22) Filed: Jun. 5, 2023

(65) Prior Publication Data

US 2023/0390040 A1 Dec. 7, 2023

Related U.S. Application Data

(60) Provisional application No. 63/348,958, filed on Jun. 3, 2022.

(51) Int. Cl.
*A61C 13/15* (2006.01)
*A61C 1/08* (2006.01)

(52) U.S. Cl.
CPC ............ *A61C 19/003* (2013.01); *A61C 1/088* (2013.01)

(58) Field of Classification Search
CPC .............................. A61C 19/003; A61C 1/088
See application file for complete search history.

(56) References Cited

U.S. PATENT DOCUMENTS

2021/0299950 A1* 9/2021 Wolter ............... A61C 13/0003

FOREIGN PATENT DOCUMENTS

| EP | 4531794 | 4/2025 |
|---|---|---|
| KR | 20210045951 | 4/2021 |
| WO | 2021048733 | 3/2021 |
| WO | 2023235635 | 12/2023 |

OTHER PUBLICATIONS

Lange (Polymer Eng. And Sci., 1999) (Year: 1999).*
Palitsch (Journal of Dentistry, 2012) (Year: 2012).*
SprintRay ProCure 2 https://sprintray.com/procure-2-advanced-dental-3d-printing-post-curing/ (Year: 2021).*
Wayback machine capture of SprintRay Procure 2 in Nov. 2021 (Year: 2021).*
"International Application Serial No. PCT US2023 024487, International Search Report mailed Aug. 25, 2023", 3 pgs.
"International Application Serial No. PCT US2023 024487, Written Opinion mailed Aug. 25, 2023", 5 pgs.
"International Application Serial No. PCT US2023 024487, International Preliminary Report on Patentability mailed Dec. 12, 2024", 7 pgs.
"European Application Serial No. 23735917.9, Response filed Jul. 7, 2025 to Communication pursuant to Rules 161(1) and 162 EPC Mailed Jan. 13, 2025", 10 pgs.

* cited by examiner

*Primary Examiner* — JaMel M Nelson
*Assistant Examiner* — Erica Hartsell Funk
(74) *Attorney, Agent, or Firm* — SCHWEGMAN LUNDBERG & WOESSNER, P.A.

(57) ABSTRACT

The present invention relates to methods for curing polymeric dental appliances comprised of partially cured photopolymerizable components, especially for additively manufactured denture base and artificial tooth components utilized in the production of full and partial dental prostheses. In particular, the invention relates to methods of utilizing a curing apparatus having one or more controllable heating sources and one or more controllable LED light sources to achieve specific preheating and light curing conditions for more effectively converting partially cured photopolymerizable components from a partially cured state to a final cured state.

16 Claims, No Drawings

METHODS FOR CURING DENTAL APPLIANCES

CROSS-REFERENCE TO RELATED APPLICATIONS

This application claims the benefit of and priority to U.S. Provisional Application No. 63/348,958 filed Jun. 3, 2022, which is herein incorporated by reference for all purposes.

FIELD OF THE INVENTION

The present invention relates to improved methods for curing polymeric dental appliances, such as a dental prosthesis (e.g., partial or full denture) and/or dental restoration (e.g., crown or bridge) that may include an artificial tooth and/or set of artificial teeth. More particularly, the invention relates to methods for curing a polymeric dental prosthesis that includes a polymeric and/or composite resin denture base having polymeric and/or composite resin artificial teeth.

BACKGROUND

Polymeric dental prostheses, such as partial or full dentures, are a common solution for individuals with missing or damaged teeth. These dentures are formed typically via polymerization of (meth)acrylate, urethane-(meth)acrylate, or other monomeric and/or oligomeric materials, and are custom-designed and fitted to a patient's specific edentulous oral situation to provide a comfortable, functional, and visually appealing and complementary replacement for missing or damaged natural teeth. Dentures are manufactured typically from the combination of a suitably colored (e.g., gingiva or intraoral tissue) denture base material component, and at least one suitably colored (e.g., tooth-colored) artificial tooth material component. Polymeric and/or composite resin (e.g., polymer reinforced with ceramic or other inorganic particles) compositions have been found to be particularly durable and well-suited to these applications, owing to their versatile physical properties (both in manufacturing and in use), biocompatibility, and relative cost-effectiveness.

Historically, both the denture base components and the artificial teeth components made from these compositions typically have been produced either by some version of a direct casting or injection molding process, or CNC (computer numerical control) milling process. More recently, there have been significant advances in the development of additive manufacturing (AM) or generative manufacturing technologies (also known as three-dimensional (3D) printing), where virtual designs of custom or bespoke denture bases, artificial teeth, and/or other dental restorative articles can be "printed" or formed in a progressive layer-by-layer, dropwise, or continuous photocuring manner. Here, photopolymerizable fluid polymeric or composite resin compositions can be prepared and loaded into programmable digitally-controlled light-based curing systems, such as SLA or DLP-based AM systems ("vat photopolymerization"), and/or material jetting systems (e.g., inkjet, MultiJet/PolyJet printing systems). However, although the controlled photopolymerization process of these AM systems is suitable for the initial solidification or hardening of liquid photopolymer material to form solid articles, such solid articles are, in relative terms, only incompletely or partially cured throughout the material during the initial formative processing. These photopolymerized solid articles typically still need to be further processed to a complete, or substantially complete, final cured condition. Achieving a final cured condition prior to intended use is desirable so that the polymerized material fully develops its intended mechanical properties (e.g., strength, toughness), while also reducing the likelihood of significant material changes over time (i.e., providing material stability and/or performance consistency during the expected usable life of the article), and minimizing potential cytotoxicity risks attributable to undesirably elevated levels of unreacted residual monomers.

Final curing of partially cured photopolymerizable materials is typically conducted by means of so-called light curing units or systems, which contain suitable light emitting hardware or elements to activate the one or more photopolymerization catalysts (photoinitiators) included in a photopolymerizable material. Various light curing units, having a variety of light emitting hardware or elements, have been proposed and/or made commercially available to perform such final curing of additively manufactured articles. Also known are light curing units that further include heating as an option for the final curing process.

In some cases, photopolymerizable materials may contain only a single type of photoinitiator, such as an acylphosphine oxide derivative like 2,4,6-trimethylbenzoyl-diphenylphosphine oxide (TPO) (having a maximum optical absorption wavelength band in the range of about 370 nm-405 nm). In such cases, curing units and methods using light emitting element(s) that produce a more targeted or limited wavelength output (e.g., predominately UV or UV-A) may be used. Alternatively, in other cases, photopolymerizable materials may include a combination of photoinitiators having significantly different maximum absorption wavelengths, such as an acylphosphine oxide derivative and an alpha-diketone derivative like camphorquinone (CQ) (camphorquinone has a maximum optical absorption wavelength band in the range of about 430 nm-490 nm). In these cases, curing units and methods either with light emitting element(s) that produce a broader wavelength output range (e.g., UV-Visible-IR, such as from halogen or xenon lamps), or with combinations of different light emitting element(s) that produce at least two different, more targeted wavelength outputs (e.g., UV-A and visible "blue" light) may be used.

However, there are disadvantages or tradeoffs associated with the known light curing units and methods, particularly with respect to curing efficiency, effectiveness, and/or reliability.

Halogen lamps emit light in a broad light wavelength range between 350 nm and 800 nm. The wavelengths of light which are not suitable for photopolymerization of the dental component are filtered out. As a result, a significant quantity of the emitted energy is lost or not utilized in photopolymerization. Moreover, halogen lamps typically have a more limited life expectancy than LED (light-emitting diode) lights during normal use, thus requiring frequent replacement.

There is a need, therefore, for improved methods of fully curing polymeric dental appliances in an efficient and cost-effective manner to satisfy the desired end use performance properties. It would be desirable, therefore, to have such methods to provide more effective and reliable curing of photopolymerizable materials, resulting in dental prostheses that are comfortable, functional, and long-lasting. The present invention provides such methods, as described in detail below.

SUMMARY

The present invention is directed to methods of curing a polymeric dental appliance in a curing apparatus, where the polymeric dental appliance is comprised of one or more partially cured photopolymerizable components.

According to one embodiment of the invention, a method of curing a polymeric dental appliance having one or more partially cured photopolymerizable components may comprise: (a) placing the polymeric dental appliance in a curing chamber of a curing apparatus having one or more controllable heating sources and one or more controllable LED light sources, wherein the one or more controllable LED light sources is capable of emitting light in the ultraviolet and/or visible wavelength range; (b) performing a preheating step in the curing chamber, wherein the one or more controllable heating sources heats the polymeric dental appliance in a time period of $t_1$, wherein 1 minute$\leq t_1 \leq$40 minutes, to a temperature $T_1 \geq T_9(Lowest)$, where $T_g(Lowest)$ is a glass transition temperature for one of the one or more partially cured photopolymerizable components having the lowest glass transition temperature value of the one or more partially cured photopolymerizable components, and wherein the one or more controllable LED light sources is substantially or completely inactive from emitting the ultraviolet and/or visible wavelength range during the preheating step until at least the temperature $T_g(Lowest)$ is achieved in the curing chamber; and (c) performing a curing step in the curing chamber, wherein the one or more controllable heating sources maintains the polymeric dental appliance at a temperature $T_2 \geq T_g(Lowest)$ for a time period of $t_2$, wherein 2 minutes$\leq t_2 \leq$120 minutes, while the one or more controllable LED light sources emits light in the ultraviolet and/or visible wavelength range onto the polymeric dental appliance for a time period of $t_3$, wherein 2 minutes$\leq t_3 \leq$120 minutes, and $t_3 \leq t_2$; wherein the one or more partially cured photopolymerizable components is converted from a partially cured state to a final cured state to form a finally cured polymeric dental appliance.

In a preferred embodiment of polymeric dental appliance, the one or more partially cured photopolymerizable components may be selected from the group consisting of a full denture base, a partial denture base, an artificial tooth, a plurality of artificial teeth, a crown, a bridge, and combinations thereof.

In a preferred embodiment of the curing step, a first controllable LED light source of the one or more controllable LED light sources emits light having an emission peak between 375 nm and 405 nm, and a second controllable LED light source of the one or more controllable LED light sources emits light having an emission peak between 440 nm and 480 nm.

In an embodiment, $T_g(Lowest)$ is at least about 50° C., and no more than about 120° C.

In an embodiment, the temperature $T_1$ of the preheating step is no more than about ($T_g(Lowest)$+50° C.).

In an embodiment, the temperature $T_2$ of the curing step is no more than about ($T_g(Lowest)$+50° C.).

In another embodiment of the method, prior to the step of placing the polymeric dental appliance in the curing chamber of the curing apparatus, the method may further include the step of applying at least one liquid photopolymerizable composition to at least one portion of the polymeric dental appliance. In an embodiment, the at least one liquid photopolymerizable composition may be selected from the group consisting of a tooth bonding composition, a sealant composition, and combinations thereof. In a preferred embodiment, the at least one liquid photopolymerizable composition may comprise at least one photoinitiator activated by light in the 375 nm to 405 nm wavelength range, and at least one photoinitiator activated by light in the 440 nm to 480 nm wavelength range.

In another embodiment of the method, after the step of placing the polymeric dental appliance in the curing chamber of the curing apparatus and prior to the step of preheating the curing chamber of the curing apparatus, the method may further comprise the step of tack curing the at least one liquid photopolymerizable composition at the at least one portion of the polymeric dental appliance in the curing chamber, wherein the one or more controllable LED light sources emits light in the ultraviolet and/or visible wavelength range onto the polymeric dental appliance for a time period of $t_4$, wherein 5 seconds$\leq t_4 \leq$2 minutes, while the heating source is substantially or completely inactive, to at least partially cure the at least one liquid photopolymerizable composition.

In another embodiment of the method, after the step of placing the polymeric dental appliance in the curing chamber of the curing apparatus and prior to the step of preheating the curing chamber of the curing apparatus, the method may further comprise the step of tack curing the at least one liquid photopolymerizable composition at the at least one portion of the polymeric dental appliance in the curing chamber, wherein the one or more controllable LED light sources emits light onto the polymeric dental appliance for a time period of $t_4$, wherein 5 seconds$\leq t_4 \leq$2 minutes, wherein a first controllable LED light source of the one or more controllable LED light sources emits light having an emission peak between 375 nm and 405 nm, and a second controllable LED light source of the one or more controllable LED light sources emits light having an emission peak between 440 nm and 480 nm, while the heating source is substantially or completely inactive, to at least partially cure the at least one liquid photopolymerizable composition.

According to another embodiment of the invention, a method of curing a polymeric dental appliance having one or more partially cured photopolymerizable components may comprise: (a) applying at least one liquid photopolymerizable composition to at least one portion of the polymeric dental appliance; (b) placing the polymeric dental appliance in a curing chamber of a curing apparatus having one or more controllable heating sources and one or more controllable LED light sources, wherein the one or more controllable LED light sources is capable of emitting light in the ultraviolet and/or visible wavelength range; (c) performing a tack curing step in the curing chamber, wherein the one or more controllable LED light sources emits light in the ultraviolet and/or visible wavelength range on the at least one liquid photopolymerizable composition of the polymeric dental appliance for a time period of $t_4$, wherein 5 seconds$\leq t_4 \leq$2 minutes, while the heating source is substantially or completely inactive, to at least partially cure the at least one liquid photopolymerizable composition; (d) performing a preheating step in the curing chamber, wherein the one or more controllable heating sources heats the polymeric dental appliance in a time period of $t_1$, wherein 1 minute$\leq t_1 \leq$40 minutes, to a temperature $T_1 \geq T_g(Lowest)$, where $T_g(Lowest)$ is a glass transition temperature for one of the one or more partially cured photopolymerizable components having the lowest glass transition temperature value of the one or more partially cured photopolymerizable components, and wherein the one or more controllable LED light sources is substantially or completely inactive from emitting the ultraviolet and/or visible wavelength range during the preheating step until at least the temperature $T_g(Lowest)$ is achieved in the curing chamber; and (e) performing a curing step in the curing chamber, wherein the one or more controllable heating sources maintains the polymeric dental appliance at a temperature $T_2 \geq T_g$(Lowest) for a time period of $t_2$, wherein 2 minutes $\leq t_2 \leq 120$ minutes, while the one or more controllable LED light sources emits light in the ultraviolet and/or visible wavelength range onto the polymeric dental appliance for a time period of $t_3$, wherein 2 minutes $\leq t_3 \leq 120$ minutes, and $t_3 \leq t_2$, wherein the one or more partially cured photopolymerizable components is converted from a partially cured state to a final cured state to form a finally cured polymeric dental appliance.

DETAILED DESCRIPTION

Throughout this disclosure, reference is made to particular features and embodiments of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The following additional definitions shall apply throughout the specification and claims of the invention, unless specifically indicated otherwise.

The term "about" is used herein as a term of approximation to mean plus or minus 5 percent of the specified value, preferably plus or minus 3 percent of the specified value, more preferably plus or minus 1 percent of the specified value.

The terms "essentially" and "substantially" are used herein as terms of approximation to denote in large part, but not necessarily wholly or perfectly, in relation to the fundamental nature or predominant characteristic being described.

The term "at least" followed by a number is used herein to denote the start of a range beginning with that number (which may be a range having an upper limit or no upper limit, depending on the variable being defined). For example, "at least 1" means 1 or more than 1.

The terms "at most" or "no more than" followed by a number is used herein to denote the end of a range ending with that number (which may be a range having 1 or 0 as its lower limit, or a range having no lower limit, depending upon the variable being defined). For example, "at most 100" or "no more than 100" means 100 or less than 100. When, in this specification, a range is given as "(a first number) to (a second number)" or "(a first number)-(a second number)," this means a range whose lower limit is the first number and whose upper limit is the second number. For example, 1 to 5 mm means a range whose lower limit is 1 mm, and whose upper limit is 5 mm.

The term "and/or," as used herein, includes any and all possible combinations of one or more of the associated listed items, as well as the lack of combination when interpreted in the alternative ("or"). For example, "A and/or B" means A alone, B alone, or A and B together or mixtures thereof.

The terms "partially cured" or "partial cured" (or cure, curing) is used herein to denote an article or component is cured (i.e., hardened through a chemical reaction or cross-linking polymerization transformation) to some degree or some extent, but not fully or wholly cured.

The terms "fully cured", "final cured", or "finally cured" (or cure, curing) is used herein to denote an article or component is cured (i.e., hardened through a chemical reaction or cross-linking polymerization transformation) wholly or completely, or substantially completely cured.

Descriptions presented herein provide explanations and illustrative examples of improved methods for curing polymeric dental appliances comprised of partially cured photopolymerizable components, especially for additively manufactured denture base and artificial tooth components utilized in the production of full and partial dental prostheses. Disclosure of the particular aspects or features for each of these embodiments is provided in the following specification and claims.

Manufacture of Polymeric Dental Appliances

Polymeric dental appliances of the invention, in particular partial and full denture prostheses, may be comprised of a polymeric (or composite resin) denture base component and at least one polymeric (or composite resin) artificial tooth component. It is to be understood that an "artificial tooth" component as used herein may be a single artificial tooth, a plurality of artificial teeth, a crown, a bridge, and combinations thereof. The denture base component and the artificial tooth component may be comprised of the same, or essentially the same, polymeric composition, with the exception of differing types and/or amounts of coloring agents. Alternatively, the denture base component and the artificial tooth component may be comprised of substantially different polymeric compositions. In fact, it may be particularly advantageous and desirable to produce partial or full denture prostheses from a denture base component and an artificial tooth component having substantially different polymeric compositions. In such cases, it may be possible to prepare a denture base component having substantially different preferred end-use properties (e.g., hardness, abrasion resistance, fracture strength, pliability) in comparison to different preferred end-use properties for artificial tooth components.

The denture base component and artificial tooth component may each be initially formed from a fluid photopolymerizable composition that is at least partially cured (hardened) to a solid state. The initial formation and solidification process may be accomplished using known additive manufacturing or generative manufacturing techniques and systems, especially the programmable digitally-controlled light-based curing systems, such as SLA or DLP-based AM systems ("vat photopolymerization"), and/or material jetting systems (e.g., inkjet, MultiJet/PolyJet printing systems). Although in some additive manufacturing systems and techniques it may be possible to initially form the denture base component and artificial tooth component simultaneously and/or sequentially, it may be more advantageous and desirable to initially form the denture base component and artificial tooth component separately and/or independently from one another. For example, it may be more advantageous especially in scenarios where the denture base component and artificial tooth component are made of substantially different compositions, such that substantially different photopolymerization process conditions may be used to achieve desired quality or property effects in each component.

Fluid photopolymerizable compositions for the denture base and artificial tooth components may be prepared or provided from mixtures of various constituent materials known to those skilled in the art. Without intending to be limiting, such mixtures may include combinations of various monofunctional and/or multifunctional versions of monomeric and/or oligomeric compounds (especially acrylate-based, methacrylate-based, and urethane- or isocyanate-based compounds), resin-modifying particles, pigments/coloring agents, photopolymerization catalysts or photoinitiators, and polymerization inhibitors. Mixtures of the various constituent materials may be prepared or provided to suit the desired physical, chemical, biocompatibility, and stability characteristics of fluid photopolymerizable compositions sought for initial manufacturing conditions and/or final end-use performance.

The one or more photopolymerization catalysts or photoinitiators may be included in these fluid photopolymerizable compositions to cause the compositions to polymerize and harden promptly and efficiently using light-based additive manufacturing systems, Photopolymerizable compositions preferably include at least one photoinitiator compound which generates free radicals that cause polymerization to be initiated upon exposure to activating wavelengths of light, and/or a reducing compound, for example tertiary amine. The photoinitiator compound(s) typically may be present in a range of about 0.1% to about 10%, or more preferably about 0.1% to about 5% by weight of the total photopolymerizable composition. It has been observed that it also may be advantageous to include two or more different photoinitiator compounds in the photopolymerizable compositions due to considerations such as known differences in photoreactive sensitivity or efficiency, depth of cure, biocompatibility/cytotoxicity, and color stability/changes, among other reasons. For example, one commonly preferred photoinitiator used in dentistry is camphorquinone (CQ). CQ is a visible violet-to-blue light spectrum activated photoinitiator having a wavelength absorbency range between about 400 nm to about 500 nm, with a peak absorbance at about 470 nm. The activation of CQ at longer wavelength than UV-A light provides better curing depth. And while CQ can provide good depth of cure through polymer materials, it also has some known limitations or drawbacks in use, such as low polymerization efficiency (which may result in lesser material strength development), low biocompatibility, and the need to be associated with tertiary amines as a reducing agent. CQ can partially photobleach and has a yellow color, while tertiary amines can be cytotoxic and generate free radicals, both of which can contribute to a significant yellowing effect or other color changes over time that need to be considered. Thus, alternative photoinitiators that are more reactive, undergoing a self-cleavage process without the need for tertiary amine reducing agents, may also be utilized with beneficial effect, either alone or in combination with CQ. In particular, alternative photoinitiators selected from the class of acylphosphine oxide derivatives can also be used. These compounds include, for example, mono-acylphosphine oxide (MAPO), bis-acylphosphine oxide (BAPO), and 2,4,6-trimethylbenzoyl diphenylphosphine oxide (TPO). These compounds absorb light in the UV-A to visible violet range between about 350 nm to about 420 nm. These materials may be safer and more convenient for handling and exposure, and be much less susceptible to gelling under ambient light conditions. TPO has been observed to produce less yellowing effect, and provide more efficient polymerization due to its higher photoreactivity.

In the case of additively manufacturing a denture (partial or full), one or more digital STL files for a denture may be provided, which may include a denture base component and artificial tooth component. These digital files may be designed and produced using digital techniques well known in the art based on the information obtained from a dentist, such as from an intra-oral or extra-oral imaging scan of a patient or patient's dental impression. The denture base (baseplate) and teeth (single tooth, tooth segments, or full arch) may be additively manufactured from fluid photopolymerizable compositions according to established instructions and operating conditions specific to physical and/or chemical attributes of the photopolymerizable compositions and the chosen light-curing AM systems. Once printing is complete, the one or more printed components (e.g., baseplates and/or teeth) may be removed from the build platforms. Any support structures utilized in the printing process may then be removed from the one or more printed components. The one or more printed components may then be washed with one or more appropriate solvents, such as a lower alcohol (e.g., isopropanol) or other suitably compatible solvents, to remove excess or residual unreacted photopolymer material from the surface of the printed component. Suitable solvent compositions may be chosen by those skilled in the art to provide good miscibility and solvency properties for diluting and removing residual, unreacted photopolymer from printed articles without being detrimental to the integrity of the printed article. Immersion may also be accompanied by sonication, mixing, jetting, spinning, or other similar means of fluid agitation to further facilitate residual photopolymer removal from printed article surfaces. After washing, the one or more printed components may be thoroughly dried before moving to further manufacturing or finishing steps (e.g., tooth bonding to baseplate).

In scenarios where a denture base component is additively manufactured separately or independently from an artificial tooth component, a tooth bonding process may be utilized to effectively attach or secure the artificial tooth component to the denture base. For example, it may be advantageous including a step to apply a liquid tooth conditioning composition to the artificial tooth component so as to prepare or condition the tooth surface for improved penetration or surface reactivity with selected tooth bonding compositions. A liquid tooth conditioning composition may include one or more adhesion promoting monomers, dimers, or oligomers, photoinitiators, and/or solvents. Separately, one or more liquid tooth bonding compositions may be applied into tooth pockets of the denture base. In one embodiment, a liquid tooth bonding composition may be a liquid photopolymerizable composition that is similar or substantially the same as the denture base component. A liquid tooth bonding composition may include a shorter wavelength (i.e., UV-A to visible violet light) photoinitiator, such as the acylphosphine oxide types like TPO, a longer wavelength (i.e., visible violet-to-blue light) photoinitiator, such as CQ, or combinations thereof. Combinations of such photoinitiators in the liquid tooth bonding composition may be particularly preferred to optimize for photocuring efficiency and depth of cure through the denture base and artificial tooth components. Thereafter, the artificial tooth components (single tooth, tooth segments, or full arch) are inserted into tooth pockets of the denture base, and excess liquid tooth bonding composition material may be selectively removed. A suitable light source (e.g., UV and/or visible violet/blue) may be used to quickly "tack cure" lingual and buccal sides of teeth for a brief period (e.g., 10-20 seconds+/−5 seconds) on each side to simply fix or hold the tooth components in their desired placement. This process may be repeated as needed to fix the remaining teeth or segments into the denture base.

Optionally, after completing the tooth bonding process, it may be further advantageous and desirable to apply a photopolymerizable liquid sealant composition to surfaces of the artificial tooth, denture base, both the artificial tooth and denture base, or portions thereof such as margin portions where the artificial tooth and denture base meet. A photopolymerizable liquid sealant composition may be further beneficial, for example, to impart improved gloss and/or stain resistance properties to the dental appliance. A photopolymerizable liquid sealant composition may be prepared or provided from mixtures of various constituent materials known to those skilled in the art. Without intending to be limiting, such mixtures may include combinations of various monofunctional and/or multifunctional versions of monomeric and/or oligomeric compounds (especially acrylate-based, methacrylate-based, and urethane- or isocyanate-based compounds), resin-modifying particles, photopolymerization catalysts or photoinitiators, and polymerization inhibitors.

Curing Apparatus

As previously mentioned, since the initial denture base and artificial tooth components produced by additive manufacturing systems are typically obtained in a partially cured state, polymeric dental appliances having one or more partially cured photopolymerizable components may be effectively converted from a partially cured state to a final cured state using a curing apparatus. A curing apparatus may be used to ensure complete, or substantially complete, conversion and cross-linking of the photopolymerizable composition to fully realize the final mechanical properties and biocompatibility profile desired for patient use.

Without intending to be limiting, a curing apparatus for methods of the invention comprises a housing, a curing chamber disposed within the housing, one or more controllable heating sources disposed within the housing and/or the curing chamber, one or more controllable LED (light-emitting diode) light sources disposed within the housing and/or the curing chamber, and electrical components or devices known to those skilled in the art (e.g., power supply device(s), electrical circuit(s), electrical wiring, microprocessor unit(s), etc.).

A curing chamber disposed within a housing of a curing apparatus may be enclosed within a space of the housing, and have at least one openable and closeable member (e.g., a lid member, a door member, or a panel member). The at least one openable and closeable member may be suitably sized and configured in relation to the curing chamber and housing to provide convenient access for the placement and/or removal of polymeric dental appliances. Additionally, though not required, the curing chamber may further include one or more other advantageous features or components known to such curing apparatuses. As one example, at least a portion (preferably a majority) of the interior surface area of the curing chamber may be reflective to ultraviolet and/or visible light wavelengths to improve the efficiency of light energy available to the polymeric dental appliance(s) in the curing chamber during curing. As another example, a controllable, rotatable carrier tray or platform for holding polymeric dental appliance(s) may be disposed within the curing chamber and/or housing to facilitate more uniform exposure of each polymeric dental appliance to controllable LED light sources and/or controllable heating sources. Furthermore, such a controllable, rotatable carrier tray or platform may be translucent or transparent to permit emitted light from controllable LED light sources to pass through to the polymeric dental appliance(s).

In a non-limiting manner, the one or more controllable heating sources disposed within the housing and/or the curing chamber of the curing apparatus may be suitably sized and configured in relation to the housing and/or the curing chamber to effectively heat the polymeric dental appliance(s) in the curing chamber to a desired temperature and/or range of temperatures within the scope of the invention. The number or types of controllable heating sources disposed within the housing and/or curing chamber is not particularly restricted. Additionally, though not required, the curing apparatus may further include one or more inlet means (e.g., apertures, vents) for the intake of air, one or more outlet means for the exhaust of air (e.g., apertures, vents), and one or more circulation means (e.g., motorized fan) for the movement or convection of air within the curing chamber and/or housing to provide a more uniform temperature distribution within the curing chamber.

In an embodiment, the one or more controllable heating sources may be capable of heating and/or regulating the temperature of the polymeric dental appliance(s) in the curing chamber to a temperature of at least about 50° C., preferably at least about 60° C., more preferably at least about 70° C., even more preferably at least about 80° C., still even more preferably at least about 100° C., and most preferably at least about 120° C. One or more temperature sensors or control systems may be disposed within the curing chamber and/or housing to monitor and regulate the temperature of the curing chamber and/or the polymeric dental appliance(s) to specified temperatures and temperature ranges.

In a non-limiting manner, the one or more controllable LED light sources disposed within the housing and/or the curing chamber of the curing apparatus may be suitably sized and configured in relation to the housing and/or the curing chamber to effectively emit light in a desired wavelength range onto the polymeric dental appliance(s) in the curing chamber in accordance with the invention. The number or types of controllable LED light sources disposed within the housing and/or curing chamber is not particularly restricted. Preferably, a plurality of controllable LED light sources is disposed in a plurality of locations within the curing chamber to provide a more uniform and efficient emission of light onto the polymeric dental appliance(s) in the curing chamber. For example, the curing apparatus may include one or more controllable LED light sources in a bottom portion of the curing chamber, one or more controllable LED light sources in a top portion of the curing chamber, one or more controllable LED light sources in one or more side portions of the curing chamber, or combinations thereof. Additionally, the one or more controllable LED light sources may each be comprised of a single controllable LED element. Alternatively, the one or more controllable LED light sources may each be comprised of a modular or multi-chip type LED having a plurality of controllable LED elements disposed within the controllable LED light source.

In an embodiment, a curing apparatus may include one or more controllable LED light sources that alone or in combination may emit one or more light wavelengths in the ultraviolet and/or visible wavelength range. In a preferred embodiment, a curing apparatus may include one or more controllable LED light sources that emit light substantially in the UV-A wavelength range (i.e., about 320 nm to about 400 nm), and one or more controllable LED light sources that emit light substantially in the violet-to-blue visible light wavelength range (i.e., about 400 nm to about 500 nm, or especially about 450 nm to about 500 nm). In another preferred embodiment, a curing apparatus may include one or more controllable LED light sources that emit light having an emission peak between 375 nm and 405 nm, and one or more controllable LED light sources that emit light having an emission peak between 440 nm and 480 nm. In another preferred embodiment, a curing apparatus may include one or more controllable LED light sources that emit light having an emission peak between 380 nm and 390 nm, one or more controllable LED light sources that emit light having an emission peak between 390 nm and 400 nm, and one or more controllable LED light sources that emit light having an emission peak between 440 nm and 480 nm.

Methods of Curing Polymeric Dental Appliances

Methods of curing one or more partially cured photopolymerizable components of a polymeric dental appliance of the invention may include the steps of: (a) placing the polymeric dental appliance in a curing chamber of a curing apparatus having one or more controllable heating sources and one or more controllable LED light sources, wherein the one or more controllable LED light sources is capable of emitting light in the ultraviolet and/or visible wavelength range; (b) performing a preheating step in the curing chamber, wherein the one or more controllable heating sources heats the polymeric dental appliance in a time period of $t_1$, wherein 1 minute$\leq t_1 \leq$40 minutes, to a temperature $T_1 \geq T_g$(Lowest), where $T_g$(Lowest) is a glass transition temperature for one of the one or more partially cured photopolymerizable components having the lowest glass transition temperature value of the one or more partially cured photopolymerizable components, and wherein the one or more controllable LED light sources is substantially or completely inactive from emitting the ultraviolet and/or visible wavelength range during the preheating step until at least the temperature $T_g$(Lowest) is achieved in the curing chamber; and (c) performing a curing step in the curing chamber, wherein the one or more controllable heating sources maintains the polymeric dental appliance at a temperature $T_2 \geq T_g$(Lowest) for a time period of $t_2$, wherein 2 minutes$\leq t_2 \leq$120 minutes, while the one or more controllable LED light sources emits light in the ultraviolet and/or visible wavelength range onto the polymeric dental appliance for a time period of $t_3$, wherein 2 minutes$\leq t_3 \leq$120 minutes, and $t_3 \leq t_2$; wherein the one or more partially cured photopolymerizable components is converted from a partially cured state to a final cured state to form a finally cured polymeric dental appliance.

In a preferred embodiment, the one or more partially cured photopolymerizable components may be selected from the group consisting of: a full denture base, a partial denture base, an artificial tooth, a plurality of artificial teeth, a crown, a bridge, and combinations thereof.

When placing the polymeric dental appliance in the curing chamber, the polymeric dental appliance may be arranged in a suitable location and/or orientation relative to the locations and/or orientations of the one or more controllable heating sources and the one or more controllable LED light sources, whereby the polymeric dental appliance can be provided with even or balanced exposure or distribution of heat and light. Typically, though not required, the polymeric dental appliance may be arranged at or near the center of the curing chamber. Furthermore, if a plurality of polymeric dental appliances is to be placed in the curing chamber for curing at the same time, it may be preferable to keep each polymeric dental appliance set apart from each other (i.e., not touching or not stacked one upon another), and provide substantially uniform or consistent spacing between each of the polymeric dental appliances.

The preheating step, with the polymeric dental appliance in the curing chamber, may be performed with the one or more controllable heating sources of the curing apparatus, wherein the one or more controllable LED light sources is substantially or completely inactive from emitting the ultraviolet and/or visible wavelength range during the preheating step. In an embodiment, the one or more controllable heating sources heats the polymeric dental appliance to a temperature $T_1 \geq T_g$(Lowest) in a time period of $t_1$, wherein 1 minute$\leq t_1 \leq$40 minutes. $T_g$(Lowest) is a glass transition temperature for one of the one or more partially cured photopolymerizable components having the lowest glass transition temperature value of the one or more partially cured photopolymerizable components. For example, if the $T_g$ of a partially cured denture base component is less than the $T_g$ of a partially cured artificial tooth component in a polymeric dental appliance, then the one or more controllable heating sources heats the polymeric dental appliance to a temperature $T_1$ that is greater than or equal to the $T_g$ of the partially cured denture base component. In the aforementioned example, $T_g$(Lowest) is the $T_0$ of the partially cured denture base component. Likewise in the context of the aforementioned example, the $T_g$ of the partially cured artificial tooth component may represent $T_g$(Highest). In cases where two or more partially cured photopolymerizable components are present in the polymeric dental appliance, if the $T_g$ values for each component are significantly different and far removed from each other, the temperature $T_1$ may be greater than or equal to $T_g$(lowest), while still being less than $T_g$(Highest). Alternatively, in cases where two or more partially cured photopolymerizable components are present in the polymeric dental appliance, if the $T_1$ values for each component are close to each other and not significantly different, the temperature $T_g$ may be greater than or equal to $T_g$(lowest) and $T_g$(Highest). The glass transition temperature ($T_g$) of a polymer is generally defined as the temperature at or above which the molecular structure exhibits macromolecular mobility. The glass transition temperature of a polymer is the temperature region of the change from a rigid "glassy" state to a flexible "rubbery" state. When the temperature of a material is below its $T_9$, the molecular chains of amorphous material (or the amorphous portion of semicrystalline material) are frozen in place and behave like solid glass. Polymeric materials with flexible backbone show lower $T_g$, whereas polymeric materials whose molecular structure is stiff, rigid, and inflexible show a higher $T_0$. Consequently, the glass transition temperature affects a number of important technical performance properties of the material, especially mechanical strength, flexibility, and chemical resistance. $T_g$ values for polymeric materials may be determined by any of several methods known to those skilled in the art (e.g., differential scanning calorimeter (DSC)).

Preferably, the one or more controllable LED light sources is substantially or completely inactive from emitting the ultraviolet and/or visible wavelength range during the preheating step until at least the temperature $T_0$(Lowest) is achieved in the curing chamber.

Without wishing to be bound by theory, it is believed that by preheating the polymeric dental appliance to a temperature $T_1 \geq T_g$(Lowest), the partially cured photopolymerizable material is sufficiently softened to allow for greater molecular movement and rearrangement prior to and during the curing step. Moreover, increasing temperature of photopolymerizable material above its $T_g$ provides additional kinetic energy to the unreacted or partially polymerized chains, catalyzing the rate of additional crosslinking activity, and improving the degree of conversion or extent of crosslinking obtainable in the one or more partially cured photopolymerizable components during the subsequent curing step. As a consequence, the quality of one or more mechanical strength properties obtainable for the photopolymerizable material in the final cured state can be improved. In support of this, for example, surprisingly it has been observed that Flexural Strength (Flexural Stress, Flexural Modulus) can be increased for photopolymerizable material that has been processed to a final cured state in accordance with a preheating step and a curing step of the invention, when compared to photopolymerizable material that has been processed to a final cured state with only a curing step and no preheating step.

In a preferred embodiment of the method, $T_g$(Lowest) may be at least about 50° C., and no more than about 120° C. In another more preferred embodiment of the method, $T_g$(Lowest) may be at least about 55° C., and no more than about 110° C. In another even more preferred embodiment of the method, $T_g$(Lowest) may be at least about 60° C., and no more than about 105° C.

In a preferred embodiment of the method, the temperature $T_1$ may be no more than about ($T_g$(Lowest)+50° C.). In another more preferred embodiment of the method, the temperature $T_1$ may be no more than about ($T_g$(Lowest)+40° C.). In another even more preferred embodiment of the method, the temperature $T_1$ may be no more than about ($T_g$(Lowest)+30° C.).

The time period of $t_1$ for preheating the polymeric dental appliance to a temperature $T_1 \geq T_g$(Lowest) may be dependent on a range of factors. Without intending to be limiting, such factors may include the temperature of the polymeric dental appliance prior to being placed in the curing chamber, the relative size and/or thickness of the polymeric dental appliance, and the intensity or number of controllable heating sources applied to the polymeric dental appliance. In a preferred embodiment of the method, the time period of $t_1$ may be no more than 35 minutes. In another more preferred embodiment of the method, the time period of $t_1$ may be no more than 30 minutes. In another even more preferred embodiment of the method, the time period of $t_1$ may be no more than 25 minutes.

The curing step, with the polymeric dental appliance in the curing chamber, may be performed using a combination of the one or more controllable heating sources with the one or more controllable LED light sources emitting light in the ultraviolet and/or visible wavelength range onto the polymeric dental appliance. In an embodiment, the one or more controllable heating sources maintains the polymeric dental appliance at a temperature $T_2 \geq T_g$(Lowest) for a time period of $t_2$, wherein 2 minutes $\leq t_2 \leq 120$ minutes, while the one or more controllable LED light sources emits light in the ultraviolet and/or visible wavelength range onto the polymeric dental appliance for a time period of $t_3$, wherein 2 minutes $\leq t_3 \leq 120$ minutes, and $t_3 \leq t_2$. Maintaining the polymeric dental appliance at a temperature $T_2 \geq T_g$(Lowest) while the one or more controllable LED light sources emits light onto the polymeric dental appliance is believed to be beneficial on a similar basis as previously discussed with regard to the preheating step.

For partially cured photopolymerizable components having only UV-sensitive photoinitiator(s) (e.g., TPO), effectively converting the photopolymerizable component from a partially cured state to a final cured state may be readily achievable when the one or more controllable LED light sources emits light substantially in the ultraviolet wavelength range, especially the UV-A range (i.e., about 320 nm to about 400 nm). However, for partially cured photopolymerizable components having comparatively longer wavelength visible violet-to-blue light-sensitive photoinitiator(s) (e.g., camphorquinone), effectively converting the photopolymerizable component from a partially cured state to a final cured state may be more readily achievable when the one or more controllable LED light sources emits light substantially in the violet-to-blue visible light wavelength range (i.e., about 400 nm to about 500 nm, or especially about 450 nm to about 500 nm). Furthermore, it is also useful to consider scenarios where a photopolymerizable liquid tooth bonding composition is applied into tooth pockets of a denture base component for bonding an artificial tooth component to the denture base. Here, the inclusion of longer wavelength visible violet-to-blue light-sensitive photoinitiator(s) (such as camphorquinone) in the photopolymerizable liquid tooth bonding composition can be advantageous for providing better curing depth through the denture base and artificial tooth components. Thus, in some embodiments of the invention, for partially cured photopolymerizable components (or polymeric dental appliances) having both UV-sensitive photoinitiator(s) and longer wavelength visible violet-to-blue light-sensitive photoinitiator(s), it may be advantageous for at least one of the one or more controllable LED light sources to emit light substantially in the UV-A wavelength range, and at least one of the one or more controllable LED light sources to emit light substantially in the visible violet-to-blue wavelength range. In a preferred embodiment, a first controllable LED light source of the one or more controllable LED light sources emits light having an emission peak between 375 nm and 405 nm, and a second controllable LED light source of the one or more controllable LED light sources emits light having an emission peak between 440 nm and 480 nm. Here, an emission peak denotes a local maximum of the emitted electromagnetic radiation within the associated wavelength range.

The time periods of $t_2$ and $t_3$ for operating the one or more controllable heating sources and one or more controllable LED light sources, respectively, may be dependent on a range of factors. Without intending to be limiting, such factors may include the extent of partial curing attained in the photopolymerizable component prior to being placed in the curing chamber, the types and relative concentrations of photoinitiators and/or photoinhibitors present in the photopolymerizable component, and the intensity or number of controllable LED light sources emitting light onto the polymeric dental appliance. In a preferred embodiment of the method, the time periods of $t_2$ and $t_3$ may be no more than 100 minutes. In another more preferred embodiment of the method, the time periods of $t_2$ and $t_3$ may be no more than 90 minutes. In another even more preferred embodiment of the method, the time periods of $t_2$ and $t_3$ may be no more than 75 minutes. In still another even more preferred embodiment of the method, the time periods of $t_2$ and $t_3$ may be no more than 60 minutes.

In a preferred embodiment, the temperature $T_2$ may be no more than about ($T_g$(Lowest)+50° C.). In another more preferred embodiment, the temperature $T_2$ may be no more than about ($T_g$(Lowest)+40° C.). In another even more preferred embodiment, the temperature $T_2$ may be no more than about ($T_g$(Lowest)+30° C.).

In another preferred embodiment, the temperature $T_2$ may be maintained within a range of ($T_2-5°$ C.) to ($T_2+5°$ C.) for the time period of $t_2$.

In another embodiment of the method, prior to the step of placing the polymeric dental appliance in the curing chamber of the curing apparatus, the method may further include the step of applying at least one liquid photopolymerizable composition to at least one portion of the polymeric dental appliance. The at least one liquid photopolymerizable composition may include a tooth bonding composition, a sealant composition, and combinations thereof. The at least one liquid photopolymerizable composition may be applied to surfaces of the artificial tooth, denture base, both the artificial tooth and denture base, or portions thereof such as margin portions where the artificial tooth and denture base meet. Without intending to be limiting, the at least one liquid photopolymerizable composition may include at least one photoinitiator activated by light in the 375 nm to 405 nm wavelength range, and at least one photoinitiator activated by light in the 440 nm to 480 nm wavelength range.

In another embodiment of the method, after the step of placing the polymeric dental appliance in the curing chamber of the curing apparatus and prior to the step of preheating the curing chamber of the curing apparatus, the method may further include the step of tack curing the at least one liquid photopolymerizable composition at the at least one portion of the polymeric dental appliance in the curing chamber, where the one or more controllable LED light sources emits light in the ultraviolet and/or visible wavelength range onto the polymeric dental appliance for a time period of $t_4$, wherein 5 seconds≤$t_4$≤2 minutes, while the heating source is substantially or completely inactive, to at least partially cure the at least one liquid photopolymerizable composition. In a preferred embodiment, the step of tack curing may be performed such that a first controllable LED light source of the one or more controllable LED light sources emits light having an emission peak between 375 nm and 405 nm, and a second controllable LED light source of the one or more controllable LED light sources emits light having an emission peak between 440 nm and 480 nm.

EXAMPLES

A representative fluid photopolymerizable composition (Lucitone Digital Print™-3D Denture Base; available from Dentsply Sirona, Inc.) was selected for 3D-printing and comparison of various preheating and/or curing conditions. Multiple test specimen samples were printed on CARBON® M1 or M2 printers (available from Carbon, Inc.). For mechanical property testing in particular, Flexural Strength (Flexural Stress, Flexural Modulus) test specimen bars were printed in order to meet the dimensional specifications outlined in ISO 20795-1:2013. On the CARBON® M1 and M2 printers, printing process parameters were provided for a resin curing dosage ($D_c$), or dosage to cure, of 5.0 to 8.0 (e.g., 6.4), a resin absorption coefficient ($\alpha$) of 0.0012 to 0.0022 (e.g., 0.0017), and exposure compensation (EC) of 1 to 4 (e.g., 2.5). Additionally, a slice thicknesses of 100 microns was selected for slicing the 3D digital models of test specimen samples for printing.

Following removal of printed test specimen samples from printer, specimens were placed in glass containers having isopropanol (99%) to submerge each specimen. With lid secured to container, they were placed in ultrasonic water bath for an initial cleaning/wash cycle. An initial ultrasonic cleaning cycle of two minutes was performed, followed by removal of isopropanol from container and refilling container with fresh isopropanol to complete an additional one-minute ultrasonic cleaning cycle. Cleaned specimens were removed from containers and dried with compressed air.

Prepared test specimen bars were subsequently preheated and/or cured in either a Dentsply Sirona Digital Cure—Large Capacity Unit (Model No. 909170; available from Dentsply Sirona, Inc.) or a Dentsply Sirona Digital Cure Unit (Model No. 909188; available from Dentsply Sirona, Inc.) according to the various conditions outlined in the Examples below.

Evaluation of mechanical properties for printed and final cured test specimen bars was performed using an Instron® Model 3365 Universal Testing Machine (using Bluehill® Universal software) equipped with a 100 lbf (500 N) Instron Load Cell and 37±1° C. water bath according to procedures outlined in ISO 20795-1:2013. Reported mechanical property values were determined using an average of at least five (5) printed test specimen bars.

TABLE 1

Mechanical Properties of Printed and Cured Test Specimens

| Ex | Description | $T_g$ | Preheating Conditions | Curing Conditions | Flexural Stress (MPa) | Flexural Modulus (MPa) |
|---|---|---|---|---|---|---|
| 1 | LDP Denture Base (DS DC-LC Curing Apparatus) | 50° C. (±10° C.) | Preheat from 25° C. up to 80° C. in 10 minutes (no LEDs) | 60 minutes at 80° C. UV and Visible LEDs | 68.0 | 2230 |
| 2 | LDP Denture Base (DS DC-LC Curing Apparatus) | 50° C. (±10° C.) | Preheat from 25° C. up to 80° C. in 20 minutes (no LEDs) | 60 minutes at 80° C. UV and Visible LEDS | 68.5 | 2250 |
| C-1A | LDP Denture Base (DS DC-LC Curing Apparatus) | 50° C. (±10° C.) | N/A—None | 25° C. up to 80° C. in 60 minutes UV and Visible LEDS | 57.0 | 1920 |
| C-1B | LDP Denture Base (DS DC-LC Curing Apparatus) | 50° C. (±10° C.) | N/A—None | 60 minutes at 80° C. UV and Visible LEDS | 60.0 | 1980 |
| 3 | LDP Denture Base (DS DC Curing Apparatus) | 50° C. (±10° C.) | Preheat from 25° C. up to 90° C. in 20 minutes (no LEDs) | 15 minutes at 90° C.-100° C. UV and Visible LEDS | 66.4 | 2160 |
| 4 | LDP Denture Base (DS DC Curing Apparatus) | 50° C. (±10° C.) | Preheat from 25° C. up to 90° C. in 20 minutes (no LEDs) | 25 minutes at 90° C.-100° C. UV and Visible LEDs | 72.9 | 2300 |

TABLE 1-continued

Mechanical Properties of Printed and Cured Test Specimens

| Ex | Description | $T_g$ | Preheating Conditions | Curing Conditions | Flexural Stress (MPa) | Flexural Modulus (MPa) |
|---|---|---|---|---|---|---|
| 5 | LDP Denture Base (DS DC Curing Apparatus) | 50° C. (±10° C.) | Preheat from 25° C. up to 80° C. in 15 minutes (no LEDs) | 20 minutes at 80° C.-100° C. UV and Visible LEDs | 67.3 | 2230 |
| 6 | LDP Denture Base (DS DC Curing Apparatus) | 50° C. (±10° C.) | Preheat from 25° C. up to 60° C. in 10 minutes (no LEDs) | 20 minutes at 60° C.-100° C. UV and Visible LEDs | 65.6 | 2170 |
| C-2 | LDP Denture Base (DS DC Curing Apparatus) | 50° C. (±10° C.) | N/A—None | 25° C. up to 99° C. in 15 minutes UV and Visible LEDs | 59.6 | 1940 |

As can be seen in the preceding examples for the "DS DC-LC Curing Apparatus" (operating with combination of 385 nm, 395 nm, and 470 nm LEDs), Flexural Stress and Flexural Modulus values for test specimen bars were significantly improved by embodiments of preheating and curing steps of the invention (Ex. 1 and Ex. 2) in comparison to test specimen bars where no preheating was implemented (Ex. C-1A and C-1B). Similarly, as can be seen in the preceding examples for the "DS DC Curing Apparatus" (operating with combination of 385 nm and 450 nm LEDs), Flexural Stress and Flexural Modulus values for test specimen bars were significantly improved by embodiments of preheating and curing steps of the invention (Ex. 3 through 6) in comparison to test specimen bars where no preheating was implemented (Ex. C-2).

It should be understood that the present invention does not require that all the preferred or advantageous features, nor all the advantages, need to be incorporated into every embodiment of the invention. Although the present invention has been described in considerable detail with reference to certain preferred versions thereof, other versions are possible within the scope the invention. Therefore, the spirit and scope of the appended claims should not be limited to the description of the preferred versions contained herein. All of the features disclosed in this specification, including any accompanying claims, abstract, and drawings, may be replaced by alternative features serving the same, equivalent, or similar purpose, unless expressly stated otherwise. Thus, unless expressly stated otherwise, each feature disclosed is one example only of a generic series of equivalent or similar features.

What is claimed is:

1. A method of curing a polymeric dental appliance, the polymeric dental appliance having one or more partially cured photopolymerizable components, comprising:
   (a) placing the polymeric dental appliance in a curing chamber of a curing apparatus having one or more controllable heating sources, which are non-light based, and one or more controllable LED light sources, wherein the one or more controllable LED light sources is capable of emitting light in the ultraviolet and/or visible wavelength range;
   (b) performing a preheating step in the curing chamber, wherein the one or more controllable heating sources heats the polymeric dental appliance in a time period of $t_1$, wherein 1 minute$\leq t_1 \leq$40 minutes, to a temperature $T_1 \geq T_g$ (Lowest), where $T_g$ (Lowest) is a glass transition temperature for one of the one or more partially cured photopolymerizable components having the lowest glass transition temperature value of the one or more partially cured photopolymerizable components, and wherein the one or more controllable LED light sources is substantially or completely inactive from emitting the ultraviolet and/or visible wavelength range during the preheating step until at least the temperature $T_g$ (Lowest) is achieved in the curing chamber; and
   (c) performing a curing step in the curing chamber, wherein the one or more controllable heating sources maintains the polymeric dental appliance at a temperature $T_2 \geq T_g$ (Lowest) for a time period of $t_2$, wherein 2 minutes$\leq t_2 \leq$120 minutes, while the one or more controllable LED light sources emits light in the ultraviolet and/or visible wavelength range onto the polymeric dental appliance for a time period of $t_3$, wherein 2 minutes$\leq t_3 \leq$120 minutes, and $t_3 \leq t_2$, wherein the one or more partially cured photopolymerizable components is converted from a partially cured state to a final cured state to form a finally cured polymeric dental appliance.

2. The method according to claim 1, wherein the curing step, a first controllable LED light source of the one or more controllable LED light sources emits light having an emission peak between 375 nm and 405 nm, and a second controllable LED light source of the one or more controllable LED light sources emits light having an emission peak between 440 nm and 480 nm.

3. The method according to claim 1, wherein the one or more partially cured photopolymerizable components is selected from the group consisting of a full denture base, a partial denture base, an artificial tooth, a plurality of artificial teeth, a crown, a bridge, and combinations thereof.

4. The method according to claim 1, wherein $T_g$ (Lowest) is at least about 50° C., and no more than about 120° C.

5. The method according to claim 1, wherein the temperature $T_1$ is no more than about ($T_g$ (Lowest)+50° C.).

6. The method according to claim 1, wherein the temperature $T_2$ is no more than about ($T_g$ (Lowest)+50° C.).

7. The method according to claim 6, wherein the temperature $T_2$ is maintained within a range of ($T_2$-5° C.) to ($T_2$+5° C.) for the time period of $t_2$.

8. The method according to claim 1, wherein prior to the step of placing the polymeric dental appliance in the curing chamber of the curing apparatus, the method further comprises the step of applying at least one liquid photopolymerizable composition to at least one portion of the polymeric dental appliance.

9. The method according to claim 8, wherein the at least one liquid photopolymerizable composition is selected from the group consisting of a tooth bonding composition, a sealant composition, and combinations thereof.

10. The method according to claim 8, wherein after the step of placing the polymeric dental appliance in the curing chamber of the curing apparatus and prior to the step of preheating the curing chamber of the curing apparatus, the method further comprises the step of tack curing the at least one liquid photopolymerizable composition at the at least one portion of the polymeric dental appliance in the curing chamber, wherein the one or more controllable LED light sources emits light in the ultraviolet and/or visible wavelength range onto the polymeric dental appliance for a time period of $t_4$, wherein 5 seconds≤$t_4$≤2 minutes, while the heating source is substantially or completely inactive, to at least partially cure the at least one liquid photopolymerizable composition.

11. The method according to claim 8, wherein the at least one liquid photopolymerizable composition comprises at least one photoinitiator activated by light in the 375 nm to 405 nm wavelength range, and at least one photoinitiator activated by light in the 440 nm to 480 nm wavelength range.

12. The method according to claim 11, wherein after the step of placing the polymeric dental appliance in the curing chamber of the curing apparatus and prior to the step of preheating the curing chamber of the curing apparatus, the method further comprises the step of tack curing the at least one liquid photopolymerizable composition at the at least one portion of the polymeric dental appliance in the curing chamber, wherein the one or more controllable LED light sources emits light onto the polymeric dental appliance for a time period of $t_4$, wherein 5 seconds≤ $t_4$≤2 minutes, wherein a first controllable LED light source of the one or more controllable LED light sources emits light having an emission peak between 375 nm and 405 nm, and a second controllable LED light source of the one or more controllable LED light sources emits light having an emission peak between 440 nm and 480 nm, while the heating source is substantially or completely inactive, to at least partially cure the at least one liquid photopolymerizable composition.

13. A method of curing a polymeric dental appliance, the polymeric dental appliance having one or more partially cured photopolymerizable components, comprising:
  (a) applying at least one liquid photopolymerizable composition to at least one portion of the polymeric dental appliance;
  (b) placing the polymeric dental appliance in a curing chamber of a curing apparatus having one or more controllable heating sources, which are non-light based, and one or more controllable LED light sources, wherein the one or more controllable LED light sources is capable of emitting light in the ultraviolet and/or visible wavelength range;
  (c) performing a tack curing step in the curing chamber, wherein the one or more controllable LED light sources emits light in the ultraviolet and/or visible wavelength range on the at least one liquid photopolymerizable composition of the polymeric dental appliance for a time period of $t_4$, wherein 5 seconds≤$t_4$≤2 minutes, while the heating source is substantially or completely inactive, to at least partially cure the at least one liquid photopolymerizable composition;
  (d) performing a preheating step in the curing chamber, wherein the one or more controllable heating sources heats the polymeric dental appliance in a time period of $t_1$, wherein 1 minute≤$t_1$≤40 minutes, to a temperature $T_1$≥$T_g$ (Lowest), where $T_g$ (Lowest) is a glass transition temperature for one of the one or more partially cured photopolymerizable components having the lowest glass transition temperature value of the one or more partially cured photopolymerizable components, and wherein the one or more controllable LED light sources is substantially or completely inactive from emitting the ultraviolet and/or visible wavelength range during the preheating step until at least the temperature $T_g$ (Lowest) is achieved in the curing chamber; and
  (e) performing a curing step in the curing chamber, wherein the one or more controllable heating sources maintains the polymeric dental appliance at a temperature $T_2$≥$T_g$ (Lowest) for a time period of $t_2$, wherein 2 minutes≤$t_2$≤120 minutes, while the one or more controllable LED light sources emits light in the ultraviolet and/or visible wavelength range onto the polymeric dental appliance for a time period of $t_3$, wherein 2 minutes≤$t_3$≤120 minutes, and $t_3$≤$t_2$, wherein the one or more partially cured photopolymerizable components is converted from a partially cured state to a final cured state to form a finally cured polymeric dental appliance.

14. The method according to claim 13, wherein the at least one liquid photopolymerizable composition is selected from the group consisting of a tooth bonding composition, a sealant composition, and combinations thereof.

15. The method according to claim 13, wherein the at least one liquid photopolymerizable composition comprises at least one photoinitiator activated by light in the 375 nm to 405 nm wavelength range, and at least one photoinitiator activated by light in the 440 nm to 480 nm wavelength range.

16. The method according to claim 15, wherein the tack curing step, a first controllable LED light source of the one or more controllable LED light sources emits light having an emission peak between 375 nm and 405 nm, a second controllable LED light source of the one or more controllable LED light sources emits light having an emission peak between 440 nm and 480 nm.

* * * * *